(12) United States Patent
Liu et al.

(10) Patent No.: US 9,732,740 B2
(45) Date of Patent: Aug. 15, 2017

(54) CYLINDER

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Yu-Ching Liu, New Taipei (TW); Wei-Da Yang, New Taipei (TW); Li-Quan Zhang, Shenzhen (CN); Qing Cai, Shenzhen (CN); Zhi-Jun Peng, Shenzhen (CN); Li Li, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 160 days.

(21) Appl. No.: 14/848,039

(22) Filed: Sep. 8, 2015

(65) Prior Publication Data

US 2016/0348660 A1 Dec. 1, 2016

(30) Foreign Application Priority Data

May 29, 2015 (CN) .......................... 2015 1 0289695

(51) Int. Cl.
*F04B 35/04* (2006.01)
*F04B 39/12* (2006.01)
(Continued)

(52) U.S. Cl.
CPC .............. *F04B 35/04* (2013.01); *B65G 54/02* (2013.01); *B65G 54/025* (2013.01); *F04B 31/00* (2013.01);
(Continued)

(58) Field of Classification Search
CPC ....... B65G 54/00; B65G 54/02; F04B 7/0076; F04B 31/00; F04B 35/04; F04B 35/045; F04B 39/0005; F04B 39/12; F04B 39/121; F04B 39/122; F04B 2203/0403; F15B 15/086; F16J 1/005; F16J 1/006; F16J 1/008; F16J 1/14; F16J 1/22; F16J 1/24
See application file for complete search history.

(56) References Cited

U.S. PATENT DOCUMENTS 5,388,526 A * 2/1995 Imai .................... B65G 54/025
104/118

FOREIGN PATENT DOCUMENTS

SU 1557372 A1 * 4/1990 ............ F15B 15/086

* cited by examiner

*Primary Examiner* — Logan Kraft
(74) *Attorney, Agent, or Firm* — Steven Reiss (57) ABSTRACT

A cylinder includes a curved cylinder body, a first support member, and a piston assembly. The curved cylinder body defines a gas chamber passing through opposite ends. The first support member includes a support housing slidably mounted on the outer circumferential surface of the cylinder body and a first permanent magnet securely mounted in the support housing. The piston assembly received in the gas chamber includes a first piston member and a second piston member rotatably coupled to the first piston member. The first and second piston members respectively have a second permanent magnet which is arranged to be attracted to the first permanent magnet. When the piston assembly moves along the curved cylinder body from the first end to the second end in the gas chamber, the first support member moves with the piston assembly on the outer circumferential surface of the curved cylinder body.

20 Claims, 7 Drawing Sheets

(51) Int. Cl.
*B65G 54/02* (2006.01)
*F16J 1/00* (2006.01)
*F16J 1/24* (2006.01)
*F15B 15/08* (2006.01)
*F16J 1/22* (2006.01)
*F04B 31/00* (2006.01)
*F04B 39/00* (2006.01)

(52) U.S. Cl.
CPC ........ *F04B 35/045* (2013.01); *F04B 39/0005* (2013.01); *F04B 39/12* (2013.01); *F04B 39/121* (2013.01); *F04B 39/122* (2013.01); *F15B 15/086* (2013.01); *F16J 1/005* (2013.01); *F16J 1/006* (2013.01); *F16J 1/22* (2013.01); *F16J 1/24* (2013.01)

CYLINDER

FIELD

The subject matter herein generally relates to cylinders, and in particularly to a cylinder which does not utilize a piston rod.

BACKGROUND

A cylinder can be constructed to produce motion of a piston or to produce energy in response to motion of the piston. The piston can be coupled to a shaft by a piston rod. In other implementations, the piston can be positioned in a cylinder with a piston rod attached thereto. The piston can be driven by a fluid within the cylinder.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

A cylinder can include a curved cylinder body, a first support member, and a piston assembly. The curved cylinder body can have a first end and a second end opposite to the first end and define a gas chamber passing through the first and second ends. The first support member can include a support housing slidably mounted on an outer surface of the cylinder body and a first permanent magnet securely mounted in the support housing. The piston assembly can include a first piston member and a second piston member respectively received in the gas chamber. The first piston member can include a first connecting rod, a second permanent magnet sleeved on the first connecting rod, and a first piston sleeved on the first connecting rod and positioned adjacent to the second permanent magnet of the first piston member. The second piston member can include a second connecting rod rotatably coupled to the first connecting rod, a second permanent magnet sleeved on the second connecting rod, and a second piston sleeved on the second connecting rod and positioned adjacent to the second permanent magnet of the second piston member. The outer surfaces of the first and second piston can touch the inner surface of the cylinder body. The second permanent magnets of the first and second piston members can be arranged to be attracted to the first permanent magnet. When the piston assembly moves along the curved cylinder body from the first end to the second end in the gas chamber, the first support member moves with the piston assembly on the outer circumferential surface of the curved cylinder body by utilizing the attraction force between the first permanent magnet and the second permanent magnet.

A cylinder can include a curved cylinder body, a first support member, a second support member, and a piston assembly. The curved cylinder body can have a first end and a second end opposite to the first end and define a gas chamber passing through the first and second ends. The first support member can include a support housing slidably mounted on an outer surface of the cylinder body and a first permanent magnet securely mounted in the support housing. The second support member can include a support housing slidably mounted on the outer surface of the cylinder body and a first permanent magnet securely mounted in the support housing of the second support member. The support housing of the second support member can be positioned opposite to and coupled to the support housing of the first support member. The piston assembly received in the gas chamber can include a first piston member and a second piston member rotatably coupled to the first piston member. Each of the first and second piston members can have a second permanent magnet. The second permanent magnets of the first and second piston members can be arranged to be attracted to the first permanent magnet. When the piston assembly moves along the curved cylinder body from the first end to the second end in the gas chamber, the first support member moves with the piston assembly on the outer circumferential surface of the curved cylinder body by utilizing the attraction force between the first permanent magnet and the second permanent magnet.

Figure 1:
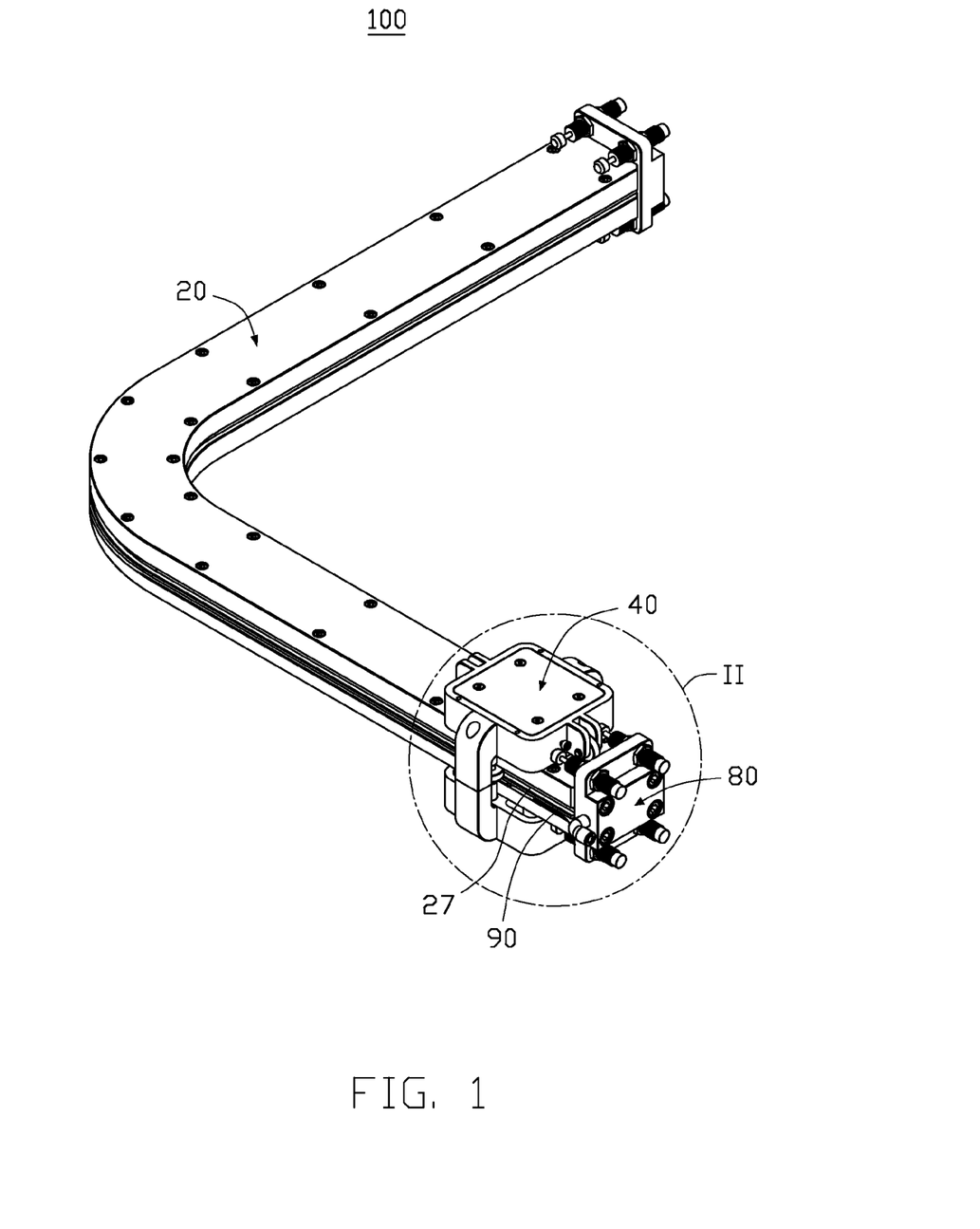
FIG. 1 is an isometric view of an embodiment of a cylinder.
Figure 2:
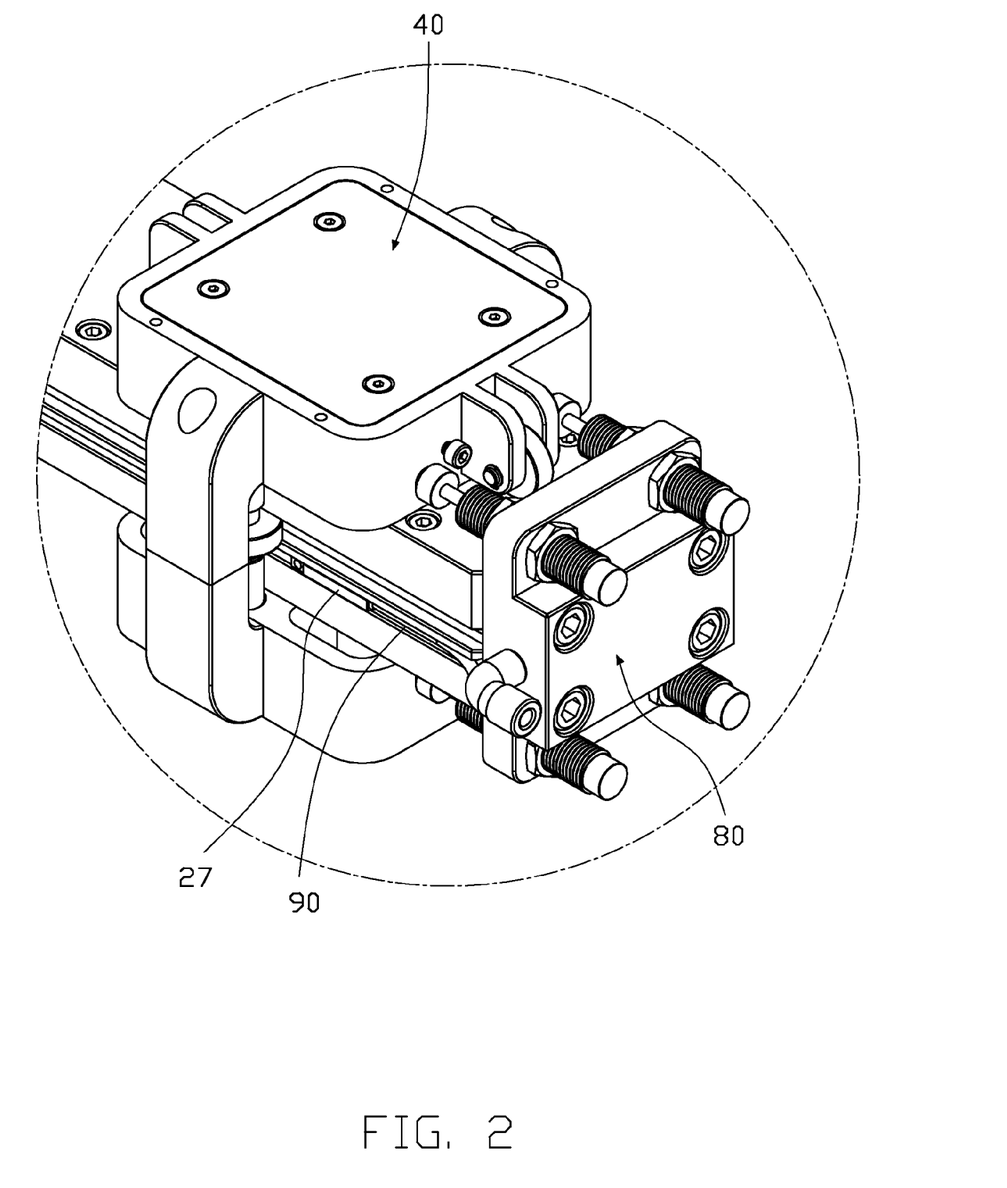
FIG. 2 is an enlarged isometric view of circle II of FIG. 1.

FIGS. 1 and 2 illustrate an embodiment of a cylinder 100. The cylinder 100 can include a cylinder body 20, a support assembly 40 slidably mounted on the outer circumferential surface of the cylinder body 20, a piston assembly 60

(shown in FIG. 3) slidably received in the cylinder body 20, two end covers 80 detachably mounted to opposite ends of the cylinder body 20, and two sensors 90 mounted on the outer circumferential surface of the cylinder body 20 and respectively located adjacent to the end covers 80.

Figure 3:
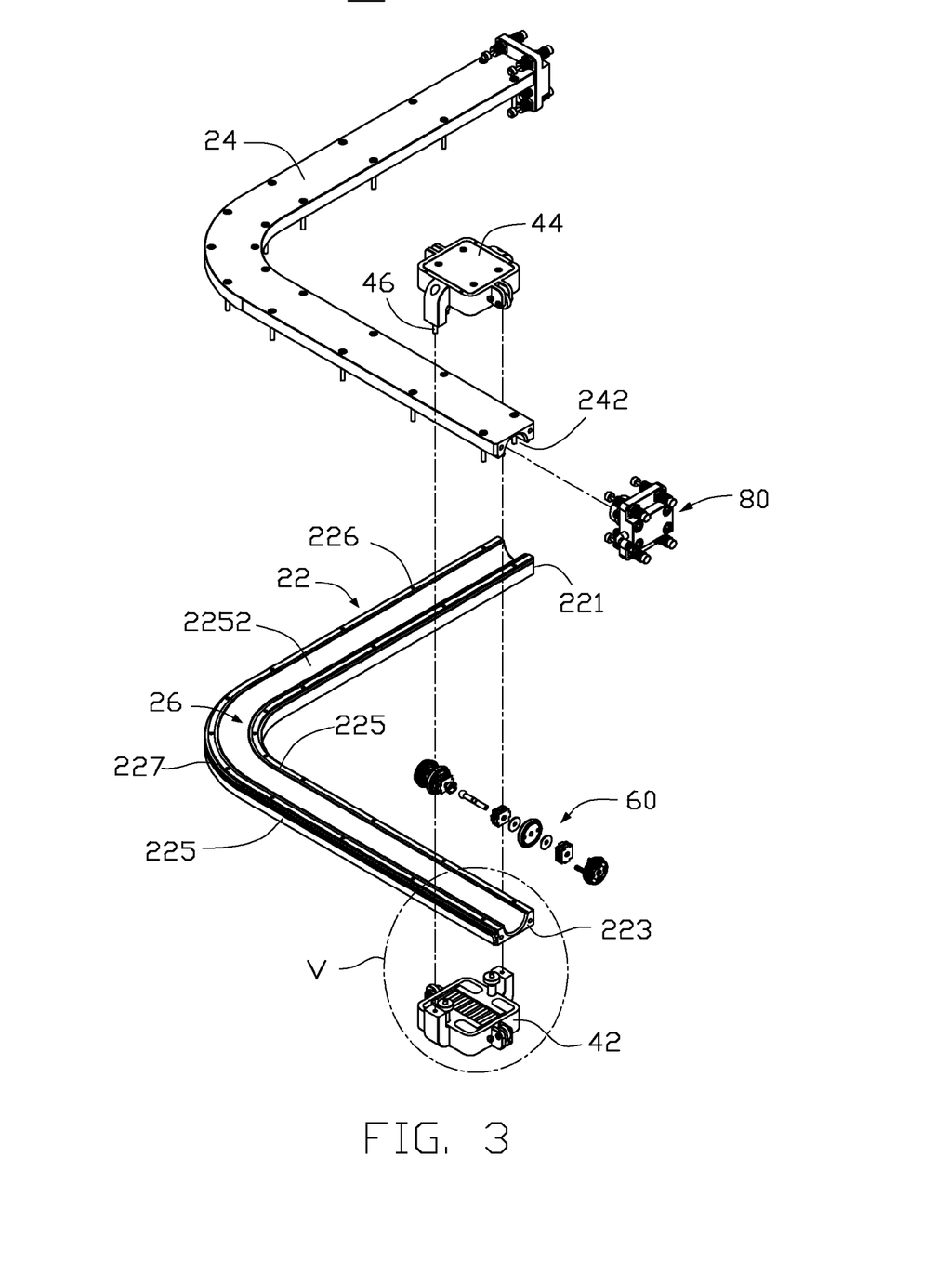
FIG. 3 is an exploded, isometric view of the cylinder of FIG. 1, the cylinder includes a piston assembly and an end cover.

FIG. 3 illustrates that the cylinder body 20 can include a first portion 22, and a second portion 24 matching with the first portion 22. The first portion 22 can be substantially curved. In the example embodiment, the first portion 22 has an "L" shape. The first portion 22 can have a first end 221, a second end 223 opposite to the first end 221, and four sidewalls 225 interconnecting the first end 221 and the second end 223. The first portion 22 can have two straight portions 226, and a curved portion 227 interconnecting the two straight portions 226. The first end 221 and the second end 223 can be respectively located on the ends of the two straight portions 226 away from the curved portion 227. The first portion 22 can define a first chamber groove 2252 on a substantially central portion of one sidewall 225. A contour of the cross section of the first chamber groove 2252 can be shaped substantially like a semicircle. The first chamber groove 2252 can extend along a direction from the first end 221 towards the second end 223 of the first portion 22. The first portion 22 can define two first sliding grooves 2254 (shown in FIG. 5) on opposite sides of the sidewall 225 having the first chamber groove 2252. Each first sliding groove 2254 can extend from the first end 221 towards the second end 223. The first portion 22 can define two sealing grooves 28 (shown in FIG. 5) which are located adjacent opposite sides of the first chamber groove 2252. Each sealing groove 28 can extend from the first end 221 to the second end 223. In at least one embodiment, the shape of the first portion 22 can be changed as needed, for example, the first portion 22 can include a number of curved portions 227.

Figure 4:
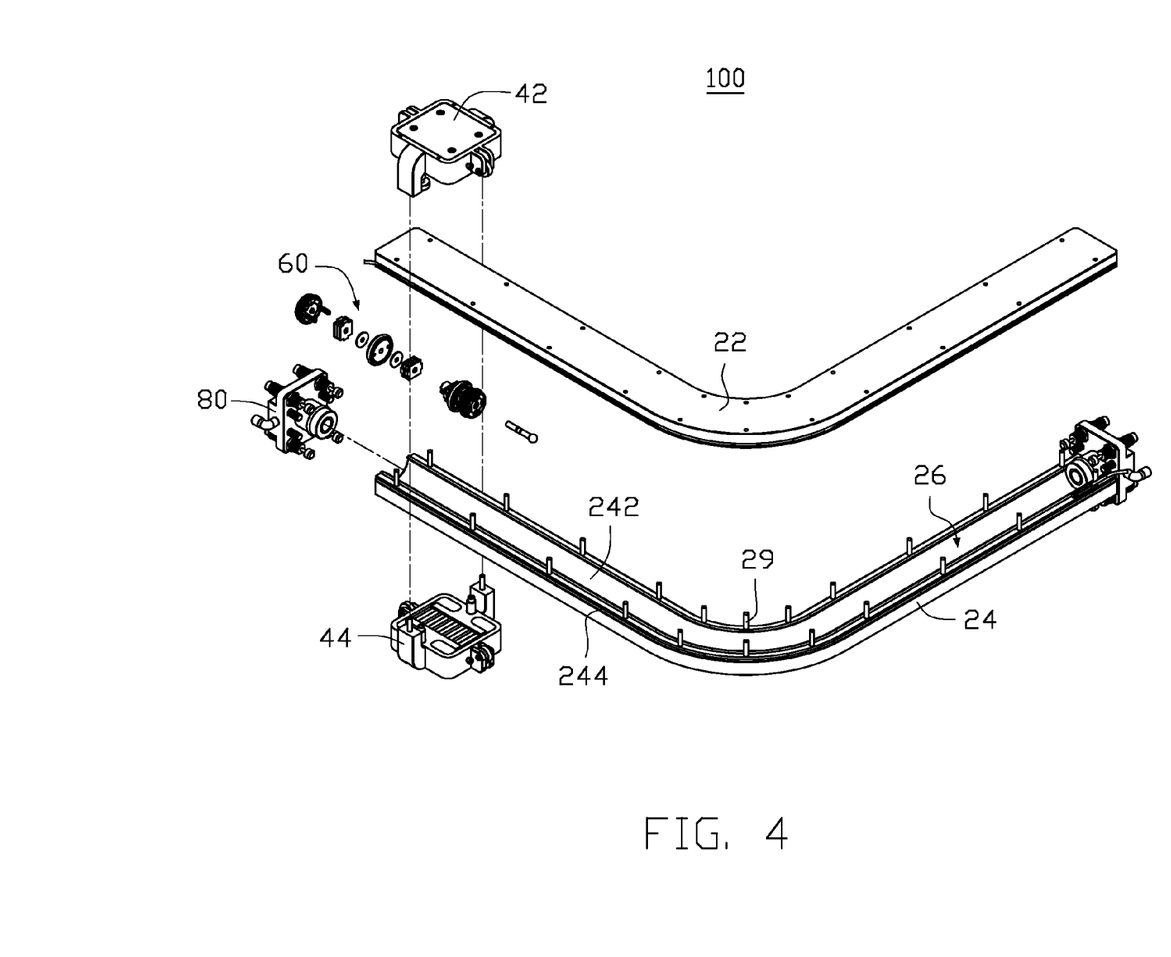
FIG. 4 is similar to FIG. 3, but viewed from another angle.
Figure 5:
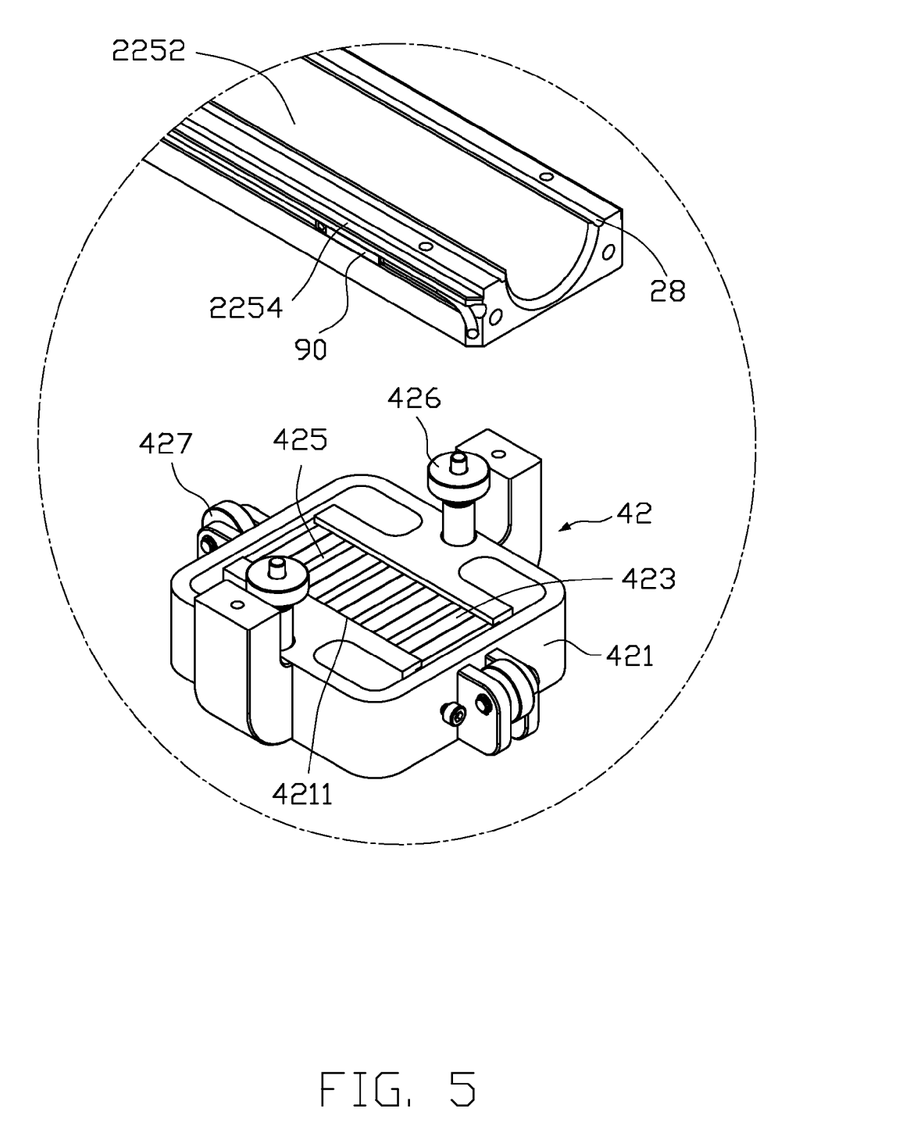
FIG. 5 is an enlarged isometric view of circle V of FIG. 3.

FIGS. 4 and 5 illustrate that the second portion 24 can have the same structure as that of the first portion 22. The second portion 24 can define a second chamber groove 242 on a substantially central portion of one sidewall of the second portion 24 facing the sidewall 225 which has the first chamber groove 2252. The second portion 24 can define two second sliding grooves 244 on opposite sides of the sidewall of the second portion 24 having the second chamber groove 242. The second portion 24 can be coupled to the first portion 22 via a number of fixing members 29, such as screws. The second chamber groove 242 and the first chamber groove 2252 can cooperatively define a gas chamber 26. Each second sliding groove 244 and the corresponding first sliding groove 2254 can cooperatively define a sliding rail 27 (shown in FIG. 2). The cylinder body 20 can include two sealing strips (not shown) to be received in the corresponding one of the sealing grooves 28. Each sealing strip can be located on the connecting portion of the first portion 22 and the second portion 24, so the first portion 22 is hermetically coupled to the second portion 24. In at least one embodiment, the sealing strips can be omitted, so long as the first portion 22 can be hermetically coupled to the second portion 24. In at least one embodiment, the first portion 22 can be integrated with the second portion 24 to form the cylinder body 20 and can define the gas chamber 26 in the cylinder body. The gas chamber 26 can pass through opposite ends of the cylinder body 20. The sliding rails 27 can be defined on opposite outer side surfaces of the cylinder body 20 and extend along the length of the cylinder body 20.

FIGS. 3 and 5 illustrate that the support assembly 40 can include a first support member 42, and a second support member 44 matching with the first support member 42. The first support member 42 can be slidably mounted on the outer circumferential surface of the cylinder body 20. The first support member 42 can include a support housing 421, a number of first permanent magnets 423 securely received in the support housing 421, a number of first fixing plates 425 received in the support housing 421, two guiding wheels 426 rotatably mounted on an end of the support housing 421, and two support wheels 427 rotatably mounted on opposite sides of the support housing 421. A receiving groove 4211 is defined on one end of the support housing 421. Each first permanent magnet 423 can be shaped substantially like a plate. The first permanent magnets 423 and the first fixing plates 425 can be arranged side by side into the receiving groove 4211. The first fixing plates 425 can be configured to divide the first permanent magnets 423 into multiple groups and to hold each group. In at least one embodiment, the first fixing plate 425 can be made of paramagnetic materials, such as pig iron. In at least one embodiment, the first fixing plates 425 can be omitted, so long as the first permanent magnets 423 can be securely held into the receiving groove 4211. The two guiding wheels 426 can be rotatably mounted on the end of the support housing 421 having the receiving groove 4211 and respectively located adjacent opposite sides of the receiving groove 4211. The guiding wheels 426 can be respectively received in the sliding rails 27 to allow the first support member 42 to move along the sliding rails 27. The support wheels 427 can touch the outer side surface of the first portion 22 to support the support housing 421 over the first portion 22. The first support member 42 can move on the outer side surface of the first portion 22 via the support wheels 427.

The second support member 44 can have a structure similar to that of the first support member 42. The second support member 44 can be slidably mounted on the outer circumferential surface of the second portion 24 and positioned opposite to the first support member 42. The only difference between the second support member 44 and the first support member 42 is that the second support member 44 does not include the guiding wheels 426. The guiding wheels 426 of the first support member 42 can be rotatably mounted on the end of the second support member 44 facing the first support member 42. The second support member 44 can be securely coupled to the first support member 42 via pin bolts 46. The first support member 42 and the second support member 44 can be located on opposite sides of the cylinder body 20. In at least one embodiment, the second support member 44 can be omitted.

Figure 6:
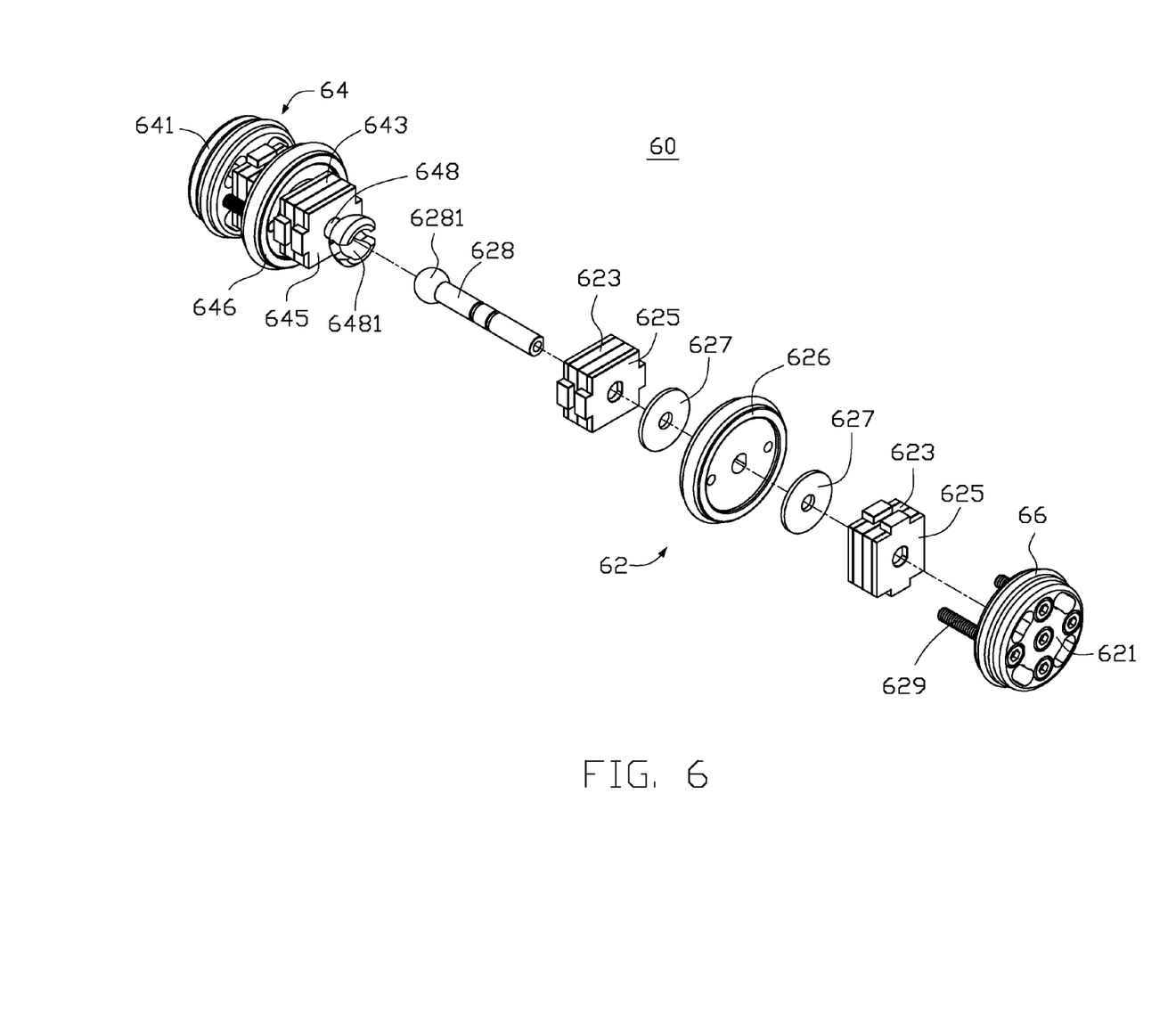
FIG. 6 is an exploded, isometric view of the piston assembly of FIG. 3.

FIGS. 3 and 6 illustrate that the piston assembly 60 can be movably received in the gas chamber 26. The piston assembly 60 can include a first piston member 62, a second piston member 64 rotatably coupled to the first piston member 62, and a number of sealing rings 66. The first piston member 62 can include a guiding member 621, a number of second permanent magnets 623, a number of fixing plates 625, a first piston 626, two baffles 627, and a first connecting rod 628. A spherical connecting portion 6281 can be formed on an end of the first connecting rod 628. The guiding member 621 can be substantially cylindrical and securely mounted on the end of the first connecting rod 628 away from the spherical connecting portion 6281. The outer circumferential surface of the guiding member 621 can touch the inner surface of the cylinder body 20. One sealing ring 66 can be sleeved on the outer side surface of the guiding member 621 to touch the inner surface of the cylinder body 20. The fixing plates 625 can divide the second permanent magnets 623 into two groups to hold each group second permanent magnets 623. The second permanent magnets 623 can be arranged to be attracted to the first permanent magnets 423.

A first group of second permanent magnets 623 can be sleeved on the first connecting rod 628 and can touch the guiding member 621. A first baffle 627 can be sleeved on the first connecting rod 628 and can touch a side of the first group of second permanent magnets 623 away from the guiding member 621. The first piston 626 can be sleeved on the first connecting rod 628 and located adjacent to a side of the first baffle 627 away from the first group of second permanent magnets 623. The first piston 626 can be securely coupled to the guiding member 621 via a fastening member 629. The outer circumferential surface of the first piston 626 can touch the inner surface of the cylinder body 20. One sealing ring 66 can be sleeved on the circumferential surface of the first piston 626 to touch the inner surface of the cylinder body 20. A second baffle 627 can be sleeved on the first connecting rod 628 and can touch a side of the first piston 626 away from the first baffle 627. The second group of second permanent magnets 623 can be sleeved on the first connecting rod 628, located adjacent to a side of the second baffle 627 away from the first piston 626, and securely coupled to the first piston 626. In at least one embodiment, two baffles 627 can be mounted in opposite sides of the first piston 626.

The second piston member 64 can have a structure similar to that of the first piston member 62. The second piston member 64 can include a guiding member 641, a number of second permanent magnets 643, a number of second fixing plates 645, a second piston 646, and a second connecting rod 648. The only difference between the second piston member 64 and the first piston member 62 is that a grooved connecting portion 6481 matching with the spherical connecting portion 6281 is formed on an end of the second connecting rod 648. The spherical connecting portion 6281 can be received in the grooved connecting portion 6481 and can rotate along any directions into the grooved connecting portion 6481.

Figure 7:
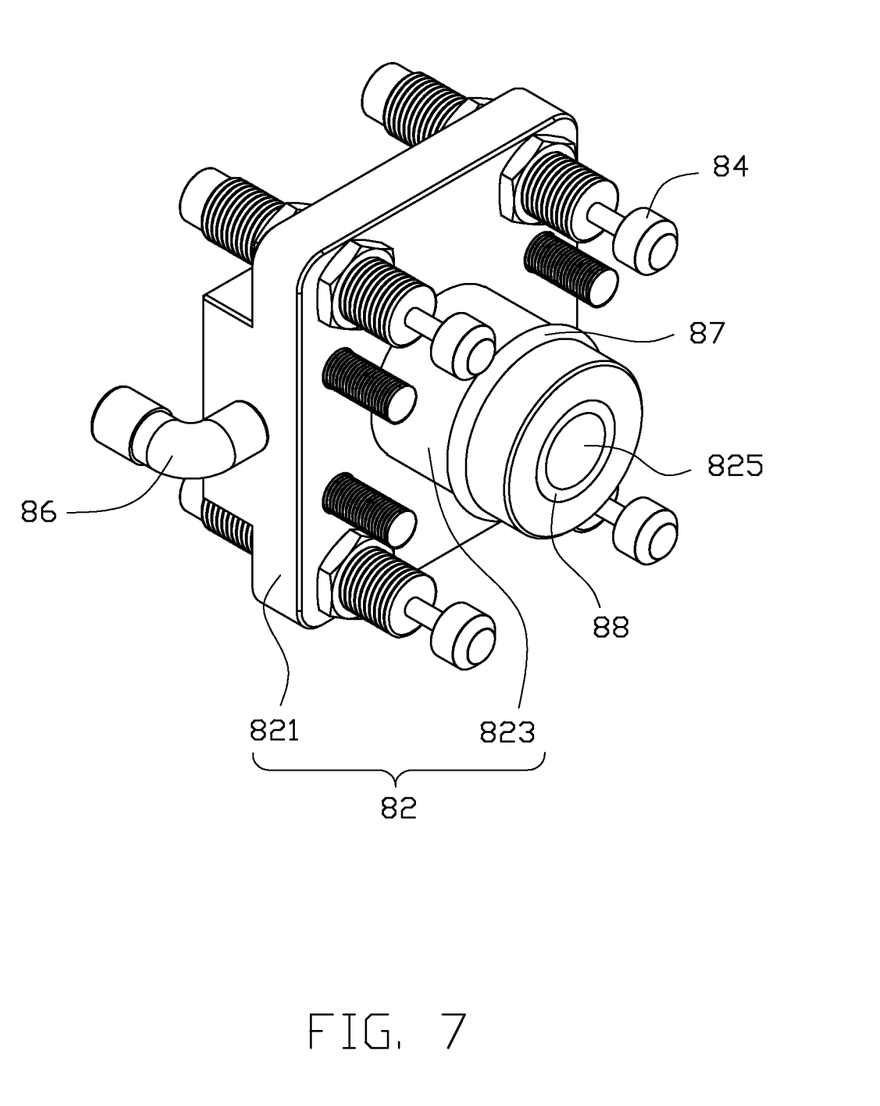
FIG. 7 is an enlarged, isometric view of the end cover of FIG. 3.

FIGS. 3 and 7 illustrate that each end cover 80 can include a cover plate 82, a number of buffer posts 84, a gas connecting head 86, a sealing ring 87, and a buffer ring 88. The cover plate 82 can include a cover portion 821 and an inserting portion 823 protruding from a side of the cover portion 821. The cover portion 821 can be configured to cover an end of the cylinder body 20. The inserting portion 823 can be substantially cylindrical and received in the gas chamber 26. The outer circumferential surface of the inserting portion 823 can touch the inner surface of the cylinder body 20. The cover plate 82 can define a gas channel 825 passing through the cover portion 821 and the inserting portion 823. A first end of the gas channel 825 can pass through an end of the inserting portion 823 away from the cover portion 821 to communicate with the gas chamber 26. A second end of the gas channel 825 can pass through a side of the cover portion 821 away from the inserting portion 823 to communicate with an external air source. The buffer posts 84 can be spaced from each other, positioned around the inserting portion 823, and located outside of the cylinder body 20.

In at least one embodiment, the end cover 80 includes four buffer posts 84 which are mounted on four corners of the cover portion 821. Two buffer posts 84 are located above the cylinder body 20 to prevent the first support member 42 from sliding out of the cylinder body 20. Another two buffer posts 84 are located below the cylinder body 20 to block the second support member 44. The sealing ring 87 can be sleeved on the circumferential surface of the inserting portion 823 to touch the inner surface of the cylinder body 20. The buffer ring 88 can be mounted on the end of the inserting portion 823 away from the cover portion 821 and can act as a cushion to a collision between the guiding member 621 and the inserting portion 823. The gas connecting head 86 can be inserted into an end of the gas channel 825 to communicate with an external air source.

FIG. 2 illustrates two sensors 90 can be mounted on opposite ends of the cylinder body 20. When the support assembly 40 moves close to any one sensor 90, the sensor 90 can send a controller (not shown) a signal, that can control the gas to stop flowing into the gas chamber 26.

In operation, external gas can flow into the gas chamber 26 via the gas connecting head 86, and then the gas can push the piston assembly 60 to move along the length of the cylinder body 20. The support assembly 40 can move with the piston assembly along the cylinder body 20 by utilizing the attraction force between the first permanent magnet 423 and the second permanent magnet 623. When the piston assembly 60 moves to the curved portion 227, the first piston member 62 can rotate relative to the second piston member 64. Both of the first piston member 62 and the second piston member 64 can pass smoothly through the curved portion 227.

While the present disclosure has been described with reference to particular embodiments, the description is illustrative of the disclosure and is not to be construed as limiting the disclosure. Therefore, those of ordinary skill in the art can make various modifications to the embodiments without departing from the scope of the disclosure as defined by the appended claims.

What is claimed is:

1. A cylinder comprising:
   a curved cylinder body having a first end and a second end opposite to the first end and defining a gas chamber passing through the first end and the second end;
   a first support member comprising:
      a support housing slidably mounted on an outer surface of the cylinder body, and
      a first permanent magnet securely mounted in the support housing; and
   a piston assembly received in the gas chamber and comprising:
      a first piston member comprising:
         a first connecting rod,
         a second permanent magnet sleeved on the first connecting rod, and
         a first piston sleeved on the first connecting rod and positioned adjacent to the second permanent magnet of the first piston member, and
      a second piston member comprising:
         a second connecting rod rotatably coupled to the first connecting rod,
         a second permanent magnet sleeved on the second connecting rod, and
      a second piston sleeved on the second connecting rod and positioned adjacent to the second permanent magnet of the second piston member,
         wherein the outer surfaces of the first and second pistons touch the inner surface of the cylinder body, and the second permanent magnets of the first and second piston members are arranged to be attracted to the first permanent magnet;
      wherein when the piston assembly moves along the curved cylinder body from the first end to the second end in the gas chamber, the first support member moves with the piston assembly on the outer surface of the curved cylinder body by utilizing the attraction force between the first permanent magnet and the second permanent magnets.

2. The cylinder of claim 1, wherein a grooved connecting portion is formed on an end of the second connecting rod, and a spherical connecting portion is formed on an end of the first connecting rod and rotatably received in the grooved connecting portion.

3. The cylinder of claim 1, wherein the curved cylinder body defines two sliding rails on opposite outer side surfaces thereof, and the first support member further comprises two guiding wheels rotatably mounted on the support housing and respectively slidably received in the sliding rails.

4. The cylinder of claim 1, wherein the first support member further comprises two support wheels rotatably mounted on the support housing, and the support wheels are movably positioned on the outer side surface of the curved cylinder body to support the support housing.

5. The cylinder of claim 1, wherein the first piston member further comprises a guiding member securely mounted on the end of the first connecting rod away from the second piston member, and the second piston member further comprises a guiding member securely mounted on the end of the second connecting rod away from the first piston member, wherein the outer surfaces of the guiding members of the first and second piston members touch the inner surface of the cylinder body.

6. The cylinder of claim 1, further comprising two end covers covering the first and second ends of the curved cylinder body, wherein each end cover comprises a cover plate, a gas connecting head mounted on the cover plate, and a gas channel defined in the cover plate to allow the gas connecting head to communicate with the gas chamber.

7. The cylinder of claim 6, wherein each cover plate comprises a cover portion to cover the first or second ends of the cylinder body and an inserting portion protruding from a side of each cover portion and received in the gas chamber, and the outer surface of each inserting portion touches the inner surface of the cylinder body; the gas connecting head is mounted on the cover portion, and the gas channel passes through the cover portion and the inserting portion.

8. The cylinder of claim 7, wherein each end cover further comprises a buffer ring mounted on the end of the inserting portion away from the cover portion, and the buffer ring is configured to act as a cushion to a collision between the piston assembly and the inserting portion.

9. The cylinder of claim 7, wherein each end cover further comprises a buffer post mounted on the cover portion and located outside of the curved cylinder body, and the buffer post is configured to prevent the first support member from sliding.

10. The cylinder of claim 1, wherein the cylinder body comprises a first portion defining a first chamber groove and a second portion matching with the first portion and defining a second chamber groove, and the first chamber groove and the second chamber groove cooperatively define the gas chamber.

11. A cylinder comprising:
a curved cylinder body having a first end and a second end opposite to the first end and defining a gas chamber passing through the first end and the second end;
a first support member comprising:
a support housing slidably mounted on an outer surface of the cylinder body, and
a first permanent magnet securely mounted in the support housing;

a second support member comprising:
a support housing slidably mounted on the outer surface of the cylinder body, positioned opposite to the support housing of the first support member, and coupled to the support housing of the first support member,
a first permanent magnet securely mounted in the support housing of the second support member; and
a piston assembly received in the gas chamber and comprising:
a first piston member having a second permanent magnet, and
a second piston member rotatably coupled to the first piston member and having a second permanent magnet,
wherein the second permanent magnets of the first and second piston members are arranged to be attracted to the first permanents magnets;
wherein when the piston assembly moves along the curved cylinder body from the first end to the second end in the gas chamber, the first support member and the second support member move with the piston assembly on the outer circumferential surface of the curved cylinder body by utilizing the attraction force between the first permanent magnets and the second permanent magnets.

12. The cylinder of claim 11, wherein the second piston member comprises a second connecting rod which has a grooved connecting portion, the first piston member comprises a first connecting rod having a spherical connecting portion and rotatably received in the grooved connecting portion.

13. The cylinder of claim 12, wherein the first piston member further comprises a guiding member securely mounted on the end of the first connecting rod away from the second piston member, and the second piston member further comprises a guiding member securely mounted on the end of the second connecting rod away from the first piston member, wherein the outer surfaces of the guiding members of the first and second piston members touch the inner surface of the cylinder body.

14. The cylinder of claim 11, wherein the curved cylinder body defines two sliding rails on opposite outer side surfaces, and the first support member further comprises two guiding wheels rotatably mounted on the support housings of the first and second support members and respectively slidably received in the sliding rails.

15. The cylinder of claim 11, wherein each of the first and second support members further comprise two support wheels rotatably mounted on the corresponding support housing, and the support wheels are movably positioned on the outer side surface of the curved cylinder body to support the corresponding support housing.

16. The cylinder of claim 11, further comprising two end covers covering the first and second end of the curved cylinder body, wherein each end cover comprises a cover plate, a gas connecting head mounted on the cover plate, and a gas channel defined in the cover plate to allow the gas connecting head to communicate with the gas chamber.

17. The cylinder of claim 16, wherein each cover plate comprises a cover portion configured to cover the first and second ends of the cylinder body and an inserting portion protruding from a side of the cover portion and received in the gas chamber; wherein the outer surface of each inserting portion touches the inner surface of the cylinder body, and the gas connecting head is mounted on the cover portion, the gas channel passes through the cover portion and the inserting portion.

18. The cylinder of claim 17, wherein each end cover further comprises a buffer ring mounted on the end of the inserting portion away from the cover portion, and the buffer ring is configured to act as a cushion to a collision between the piston assembly and the inserting portion.

19. The cylinder of claim 17, wherein each end cover further comprises a buffer post mounted on the cover portion and located outside of the curved cylinder body, and the buffer post is configured to prevent the first support member from sliding.

20. The cylinder of claim 11, wherein the cylinder body comprises a first portion defining a first chamber groove and a second portion matching with the first portion and defining a second chamber groove, and the first chamber groove and the second chamber groove cooperatively define the gas chamber.

* * * * *